(12) United States Patent
Miller et al.

(10) Patent No.: US 6,454,340 B1
(45) Date of Patent: Sep. 24, 2002

(54) COLLAPSIBLE TOP FOR CHILD'S VEHICLE, ONE-PIECE METHOD OF ASSEMBLY AND PACKAGING DESIGN FOR STORAGE AND TRANSPORT

(76) Inventors: Mark E. Miller, 3055 Williams La., Versailles, KY (US) 40383; Kathleen R. Mattone, 3055 Williams La., Versailles, KY (US) 40383

( * ) Notice: Subject to any disclaimer, the term of this patent is extended or adjusted under 35 U.S.C. 154(b) by 0 days.

(21) Appl. No.: 09/648,260

(22) Filed: Aug. 25, 2000

Related U.S. Application Data (60) Provisional application No. 60/150,918, filed on Aug. 26, 1999.

(51) Int. Cl.$^7$ .......................... B62D 25/06; E04H 15/38; E04H 15/06; B62B 1/04
(52) U.S. Cl. ........................ 296/104; 296/180; 296/105; 135/88.02; 135/136; 135/138
(58) Field of Search ........................ 135/88.01, 88.02, 135/125, 128, 136, 138; 296/102, 103, 104, 177, 180, 105

(56) References Cited

U.S. PATENT DOCUMENTS

| | | | | |
|---|---|---|---|---|
| 160,792 A | * | 3/1875 | Saunders | |
| 355,231 A | * | 12/1886 | Tomkins | |
| 450,158 A | * | 4/1891 | James | |
| 2,565,746 A | * | 8/1951 | Turner | |
| 2,665,103 A | * | 1/1954 | Flora et al. | |
| 2,942,914 A | * | 6/1960 | Noot | |
| D188,551 S | * | 8/1960 | Rassier | |
| 4,830,036 A | * | 5/1989 | Sanders | 135/904 X |
| 5,009,184 A | * | 4/1991 | Voldrich | 114/361 |
| D357,549 S | | 4/1995 | Perez, Jr. | |
| 5,447,354 A | * | 9/1995 | Delp | |
| 5,609,177 A | * | 3/1997 | Iver | 135/130 |
| 5,944,039 A | * | 8/1999 | Bergeron | 135/119 |
| 6,152,461 A | * | 11/2000 | Dunks | 280/30 |
| 6,260,566 B1 | * | 7/2001 | LaFave et al. | 135/88.01 |

\* cited by examiner

*Primary Examiner*—Robert Canfield
(74) *Attorney, Agent, or Firm*—Jack Toliver (57) ABSTRACT

A collapsible top (13) fits over a child's pull wagon (10), may be taken apart easily, and flatly packaged for store display or mail order shipment. It has a light weight, flexible frame (15) universally adjustable to fit the various sizes of wagon beds (12). In principle, however, the top may be scaled up as a tent for adults, or as a canopy for outdoor recreation. The top includes a cover material (14) stretched between a pair of spaced hoop members (16). They are bowed into an arch above their lower ends which are fitted into mounting brackets (20) secured to the corners of the wagon. A spreader rod (22) forces apart the arched portions of the hoop members sufficiently at the top to develop an overhang beyond the ends of the wagon, thereby allowing the lower legs adjustment to any wagon size, and creating internal mutual stresses between the frame and the cover in a modular, unitary structure strengthened thereby enough to avoid having to use intermediate ribs or other support parts.

20 Claims, 10 Drawing Sheets

COLLAPSIBLE TOP FOR CHILD'S VEHICLE, ONE-PIECE METHOD OF ASSEMBLY AND PACKAGING DESIGN FOR STORAGE AND TRANSPORT

This application is based on a co-pending provisional patent application, entitled Removable Wagon Cover, Ser. No. 60/150,918, filed Aug. 26, 1999 by the same inventors disclosing the same invention and made a part hereof as if incorporated herein by reference.

FIELD OF THE INVENTION

This invention relates generally to children's recreational vehicles, and more particularly to a collapsible "Conestoga" top for a child's wagon, adapted when removed from attachment to the vehicle, to be erected as a stand alone sunshade, beach canopy, tent, or weather shelter.

BACKGROUND OF THE INVENTION

There are arch frame constructed canopies that hinge on a platform mounted on top of a car for camping, e.g., U.S. Pat. No. 4,830,036 issued May. 16, 1989, and fabric covers for a framework that attaches with brackets to the sides of a wagon including tent-like roll-up side flaps, e.g., U.S. Pat. No. 5,447,354 issued Sep. 5, 1995, but none suggest an original Conestoga wagon in style or appearance, i.e., with the taut, bowed top and arched open ends made popular by the pioneers of the nineteenth century in the westward expansion of the Country.

SUMMARY OF THE INVENTION

The present invention provides a collapsible top of flexible canopy material and a hoop frame, the frame comprising a pair of hoop members, each having fixed apart lower legs, one hoop member being circumjacent each open end of the canopy material in supporting relationship to its peripheral edge, the upper portions of the hoop members and canopy material being mutually stressed, each imparting tensioning forces to the other such that the canopy material and hoop members form a modular, interdependent, one-piece structure, the upper portions of the hoop members being spread apart a mutual distance fore and aft beyond the fixed lower legs to impart a taut, bowed configuration to the canopy material resembling the distinctive Conestoga wagon top.

In a method of assembly, the hoop members are made from a pair of flexible rods of a length and diameter allowing them to bend elastically comprising the steps in assembly of bending each rod toward the other and joining it at the top by a Tee fitting to form a hoop member, the Tee fittings joining the rods opening horizontally toward each other, bending the hoop members mutually apart at the upper ends, a distance greater than the unflexed length of the flexible canopy material between the Tee fittings; while holding their lower ends in a fixed longitudinal relationship, a distance greater than the length of the flexible canopy material between the Tee fittings, and restraining the lower ends of the hoop members to a predetermined hoop shape.

A method of disassembly and packaging providing a compact, flat package for storage or transport comprises separating the hoop members at their lower ends from their mounting locations, while maintaining the lower ends restrained, and collapsing the entire top, with the canopy material in place and folded upon itself, by bringing the hoop members together so that the resulting hoop shaped package is capable of being handled safely while restrained.

In another assembly method, the flexible canopy has edge seams accessible from either end for insertion of the rods forming the hoop members, underneath the canopy, a gap is created in the seam for assembling the rod ends and the Tee fittings to form the hoop members and a spreader rod is inserted between the Tee fittings bending the hoop members a predetermined distance apart stretching the flexible canopy while the lower legs of the hoop members remain fixed, the hoop members and flexible canopy material mutually stressing each other in a modular, interdependent, one-piece fashion.

In a preferred embodiment, a mounting to secure the hoop frame to a stake wagon comprises brackets that are removably attached in the corners of the upper wooden rails of the wagon's side rails by means of Velcro straps. The straps wrap around the top wooden rails, and once secured, solidly support the collapsible top. A mounting sleeve in each bracket provides a recess into which the lower legs of the hoop members are removably inserted.

In another form of mounting, the brackets are replaced with a bi-folded pocket designed to fasten to the top rail of the wagon, the pocket and corner legs of the flexible canopy being mutually interdependent in design to fit together and a restraining strap enfolds and clamps the two together on the wagon rails, the pocket having a recess for retain the lower ends of each hoop member.

In another embodiment, the spreader rod is eliminated, and mounting brackets have sleeves inclined away from each other in a fore and aft direction relative to the wagon bed for receiving the lower ends of the hoop members disposing them at an angle initially so as to provide the longitudinal tensioning of the canopy material without requiring a separate tensioning means other than the hoop members themselves.

As a frame and shelter, when removed from the wagon, the lower legs of the hoop members are captured in a foot fabricated at the corners of the canopy material and a flap extends laterally from each foot in which a grommet if provided for receiving a stake to be driven into the ground, the modular hoop frame and canopy interdependent construction providing a structure for shelter from the sun for children playing on the ground.

There are several resulting benefits of this structure. The maximum amount of covered space for the material used is realized. No vertical center pole, upright, intermediate rib or frame member is needed to support the flexible canopy in a taut condition. The surface of the top is smooth without wrinkles and sagging rendering the fabric suitable to display the fabric pattern, special artwork, or advertising. The resulting tensioned hoop structure provides additional headroom as well as structural stability to maintain its shape in windy conditions and be stronger to resist deformation from the pushing and tugging by children.

A one-piece assembly is incorporated in the design. In a fabric material sewn to the hoop pattern shape, a cross strap is attached between each corner leg of the fabric to keep the hoop members, captured in the edge seam, from being released. By constraining the corners of the fabric, the hoop members retain their hoop shape when being assembled on, or removed from, the wagon. The cross straps hold the hoop frame bowed when not mounted in the brackets. When mounted, the edges of the fabric are pulled taut by elastic straps pulled over the lower end of each sleeve in the brackets. In removing the top, it is only necessary to remove the elastic straps and lift up the hoop frame from the brackets to convert the wagon back to a conventional stake wagon, the brackets being left on the rails, ready for installing the top again, or they may also be removed, as desired. No tools are needed to install or remove the top. The space inside the canopy is enlarged by the high-rise arched shape using the elongated hoop construction, and the modular construction provides the maximum interior room with a minimum of interior supports.

A principal object of the invention is to provide a child's vehicle with a collapsible top that has a design resembling in appearance that of a Conestoga wagon top that can be used for display of a fabric pattern, logographics, or advertising material.

Another object of the invention is to provide a canopy frame made of light weight, flexible, elongated material having a diameter to length ratio such that it is capable of being bent without breaking, and elastic enough to return repeatedly to the original elongated, or nearly straight shape.

Another object is to provide a canopy frame made of lengths of flexible rod or tubular material having a relatively high modules of elasticity capable of being bowed into an elongated hoop shape, and restrained in that condition, without developing fissures or cracks, and that can be repeatedly bent to the same hoop shape without developing fatigue cracks, internal stress fractures or causing catastrophic failure.

Another object is to provide a removable bracket assembly for the corners of a stake wagon having wooden side rails for securing the hoop frame and canopy material to the upper side rails of the wagon to provided a shelter or sun shade for children riding in the wagon.

Another object is to provide a fabric pattern cut so that when fitted to the spread apart hoop members, a high-rise, bowed, modular canopy is created due to the mutually stressed condition of the hoop frame and fabric material created by the pattern, in combination with the spreading action imparted to the hoop members creating a strong, high coverage capacity, light weight, low cost shelter for children to play under.

Another significant object is the provision of a one-piece assembly method where the hoop frame and flexible top are put on the wagon or removed as a single unit.

An alternative object is to provide a tent, shelter of sun shade when removed from the vehicle.

Another important object is the provision of a hoop frame in which the elasticity of the hoop members is, in part, dissipated into the flexible canopy material so as to distribute the resilient forces uniformly through out the material creating a smooth, taut surface against windy conditions, or when water resistant fabric is used, providing protection from the rain, if side curtains, roll down flaps, or plastic curtains are also employed.

Another object is to provide a frame and canopy pattern that can be scaled up to fit the standard wagon size ranges without changing the elements of the top within a given size range.

These and other objects will be more appreciated by reference to the detailed description and drawings.

DESCRIPTION OF THE DRAWINGS

FIGS. 2A, 2B and 2C are related views showing in FIG. 2A, one of two Tee fitting assemblies at opposite ends of the hoop frame.

FIGS. 3, 3A, and 3B are, related views of the fabric top and its mounting to the hoop frame and wagon rails, FIG. 3 showing the patent for the high-rise fabric top, FIG. 3A, a partial perspective view from underneath one end of the top showing a Tee fitting access point for assembly of a spreader rod used to stretch the fabric top.

DETAILED DESCRIPTION OF THE INVENTION

Figure 1:
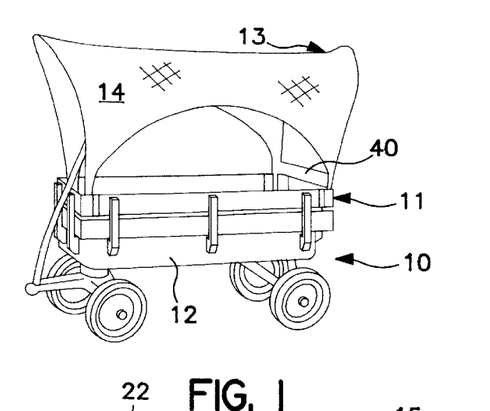
FIGS. 1 and 2 are related perspective views of a child's pull stake wagon having wood n side rails of a conventional type, the top rails supporting a high-rise canopy fabric top having a hoop frame covering the bed area of the wagon under which the children sit for shelter from the sun resembling the distinctive Conestoga wagon top.

FIG. 1 shows a conventional child's pull wagon (10) with wooden side rails (11) staked to the bed (12). In accordance with the invention, a collapsible top (13) having a distinctive Conestoga bowed shape is removably mounted above the side rails (11) providing a high-rise, canopy cover (14) for the wagon under which children can sit while riding in the wagon.

Figure 2:
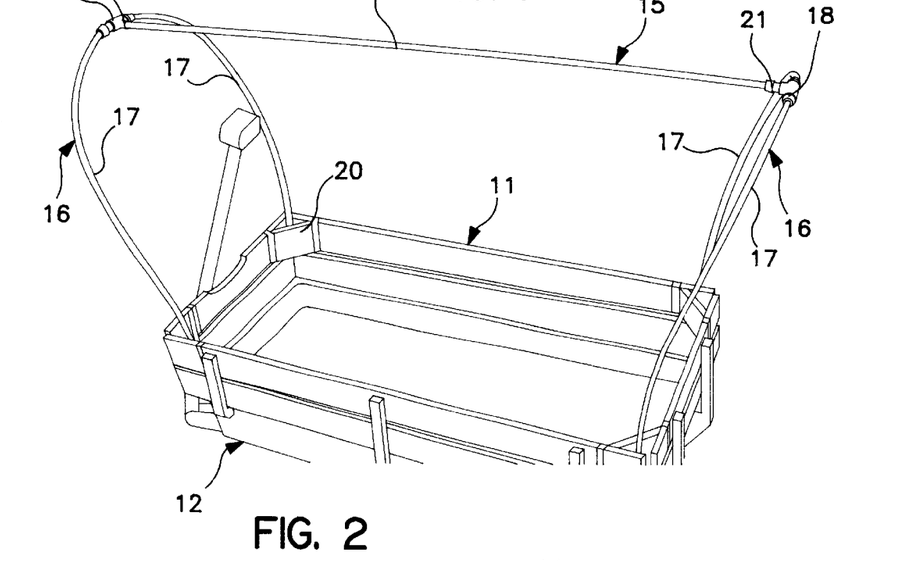
Figure 2A:
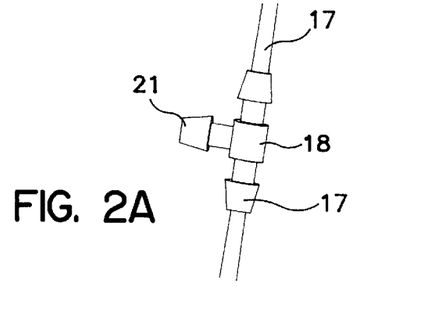

In FIG. 2, the flexible canopy cover (14) is shown removed in a partial perspective view looking down on the wagon in FIG. 1 from a upper left quarter position. A hoop frame (15) comprises a pair of hoop members (16). Each hoop member is formed from a pair of elongated, flexible elements (17) joined at the top by a Tee fitting (18) as depicted in FIG. 2A. The elongated elements (17) are of a material and a length to diameter ratio allowing them to be bowed elastically from the lower fixed ends mounted in brackets (20) fastened to the top of the side rails (11) to about 90 degrees into a partial hoop shape so that the upper ends, when aligned with and inserted into the cross portion of the Tee fittings (18), form hoop member (16). Each Tee fitting (18) has a horizontal leg (21) aligned with the Tee fitting at the opposite end for receiving a spreader element (22) the function of which is to yieldably spread apart the upper portions of the hoop members a predetermined distance as will be more apparent hereinafter.

Figure 2B:
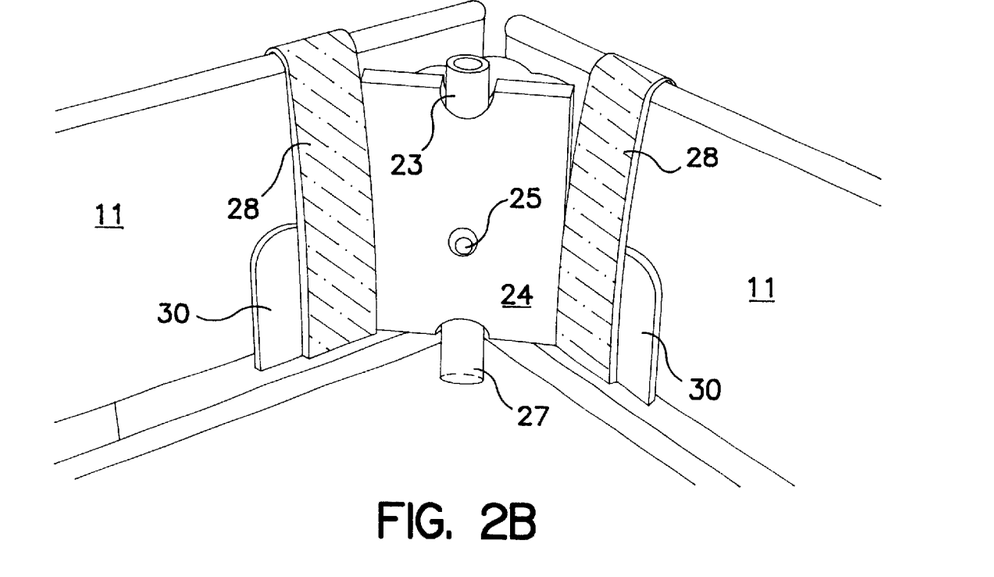
FIG. 2B is a partial, inside out, perspective view of one of four corner brackets for fastening the hoop frame to the wagon side rails.
Figure 2C:
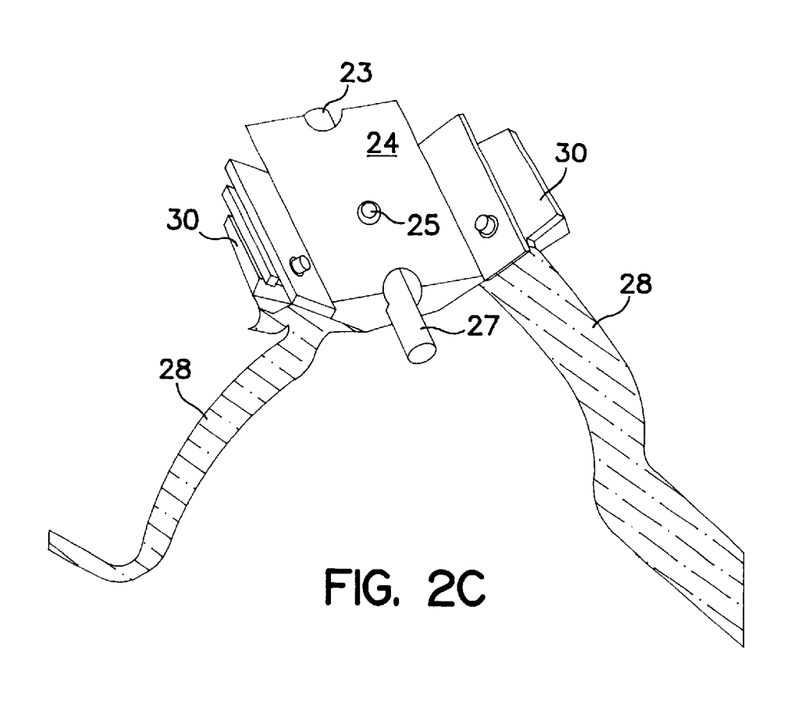
FIG. 2C is one of the brackets removed shown with Velcro attaching straps unfastened from the top rail.

As shown in the mounted and dismounted views of FIGS. 2B and 2C, each bracket (20) had a center sleeve (23) secured vertically in a base (24) such that when mounted in the corner of the side rails (11) as depicted in FIG. 2, the sleeve's top opening is accessible from above the wagon, pointing up to receive the lower leg of each pair of hoop members: (16). A protrusion (25) on each sleeve fits into a hole in the base (24) and functions as a stop for when the sleeve is inserted. The upper end of the sleeve is slightly above the top of the base so as to be about flush with the top rail of the side rails (11). The other end (27) extends past the bottom of the base for a purpose described later. Two Velcro straps (28) are secured to the base which has a pair of 90 degree disposed legs (30) flanged to fit the lower edge of the upper rail, and with the straps secured, as depicted in FIG. 2B, hold the bracket assembly firmly into the corner of the side rails (11) as shown in FIG. 2.

The elongated members (17) and (22) are preferably of a highly elastic material such as a plastic or fiberglass. For example, solid ¼" rods having a ASTM D-638-97 tensile strength average of 90214 psi and a ASTM D-790-97 flexure strength average of 115598 psi and a modulus of 5.28×10 can be repeatedly bowed in lengths required by the invention without cracking, or developing fissures, and fatigue cracks from repeated flexing leading to a failure.

Figure 3:
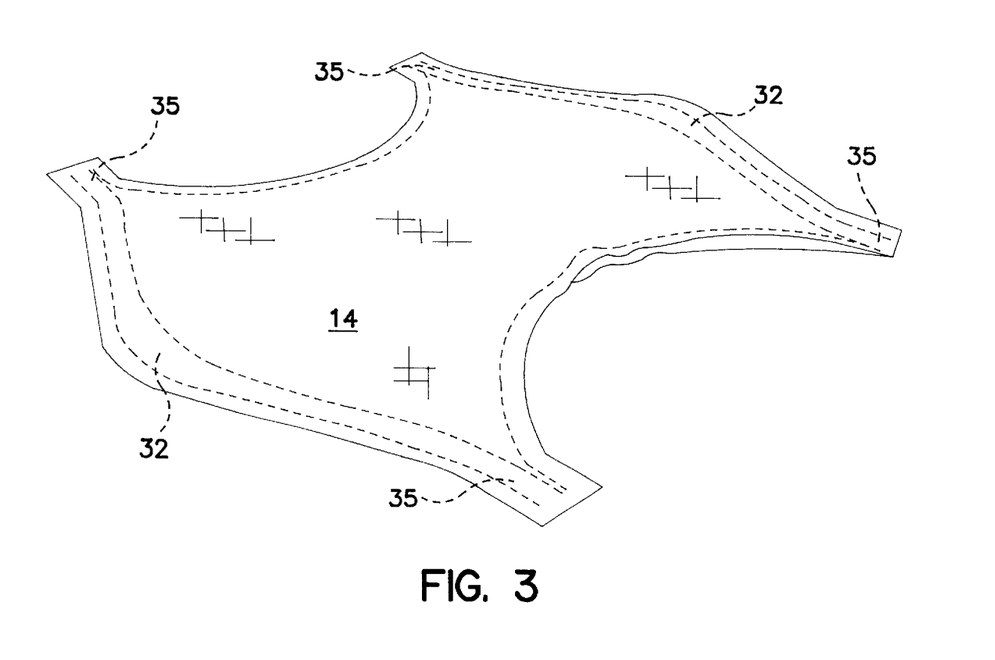
Figure 3A:
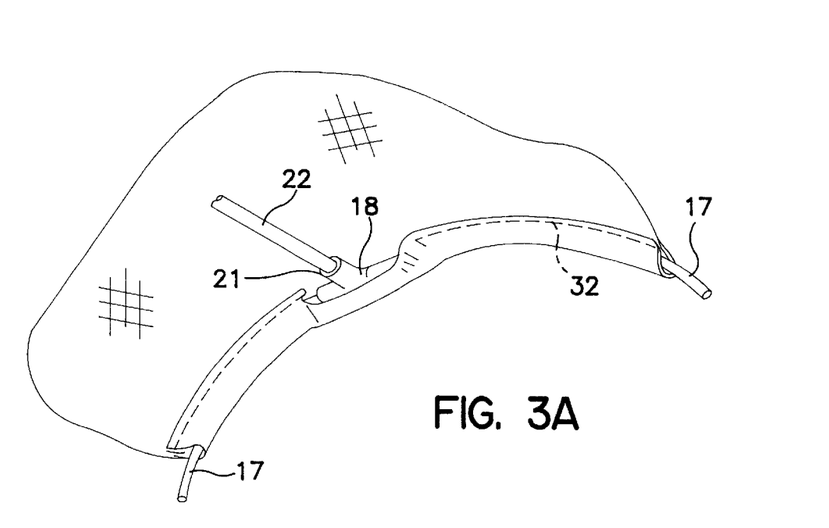

With respect to FIGS. 3 and 3A, the canopy cover (14) is shown in the shape it would be as a flat stock of flexible material cut from a sewing pattern. It is formed with edge seams defining channels (32) for receiving the hoop members and a gap intermediate the ends of the channels (32); is left for attaching the Tee fittings from underneath the canopy, as depicted in FIG. 3A. Corner legs (35) open downwardly when the canopy material is supported in the hoop shape allowing the lower legs of the hoop members to extend out and fit into the sleeves (23) of the brackets, as shown in FIG. 3B, and a pair of elastic straps (38) loop over the lower end of sleeve (23) from the corner legs (35) for tensioning the peripheral edge of the channels (32); on the hoop members.

Figure 3B:
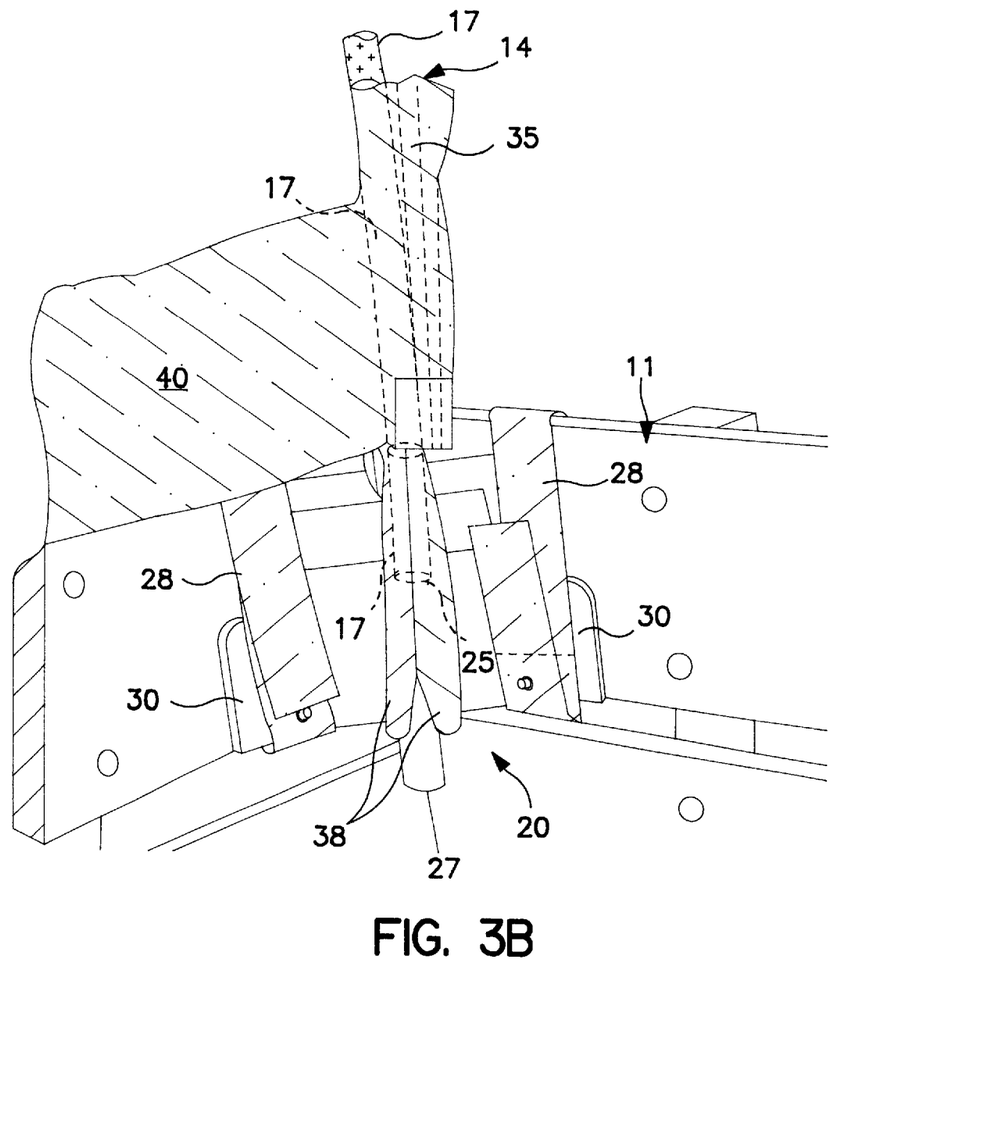
FIG. 3B is an inside out corner perspective view showing a mounting assembly of the hoop frame, fabric top and bracket in FIGS. 2B and 2C.

It is important to note, as shown in FIG. 1 and FIG. 3B, that a cross strap (40) is provided at each end of the canopy material securing each corner leg (35) and with the hoop members contained inside the channels (32) they are prevented from returning to their original linear shape. The pattern provides coverage for a high-rise canopy material which flexibly cooperates with the hoop members to become mutually stressed in an interdependent manner as a one-piece modular elastic unit. That is the longitudinal dimension of the pattern in the unflexed of static state pictured in FIG. 3; is designed to be less than the length of the spreader element (22) so that in assembly the upper portions of the hoop members are distorted laterally fore and aft a mutually satisfactory distance beyond the lower leg mounting locations on the wagon to stretch the canopy material which in turn provides resistance to the frame building up stresses in the hoop members which thereby become a more rigid; unitary frame; and with the canopy, create a onepiece; structure of higher strength than would be possible otherwise. This synergistic effect produces a stronger, light weight top than merely draping or hanging the canopy material over a frame, curtain fashion, rather the modular interdependent construction creates a stressed framework which will withstand wind, and mechanical forces to a high degree, including children pulling on it from underneath, while providing a high-rise covering of greater capacity without need for intermediate support ribs, braces or external ropes for tensioning.

Figure 4:
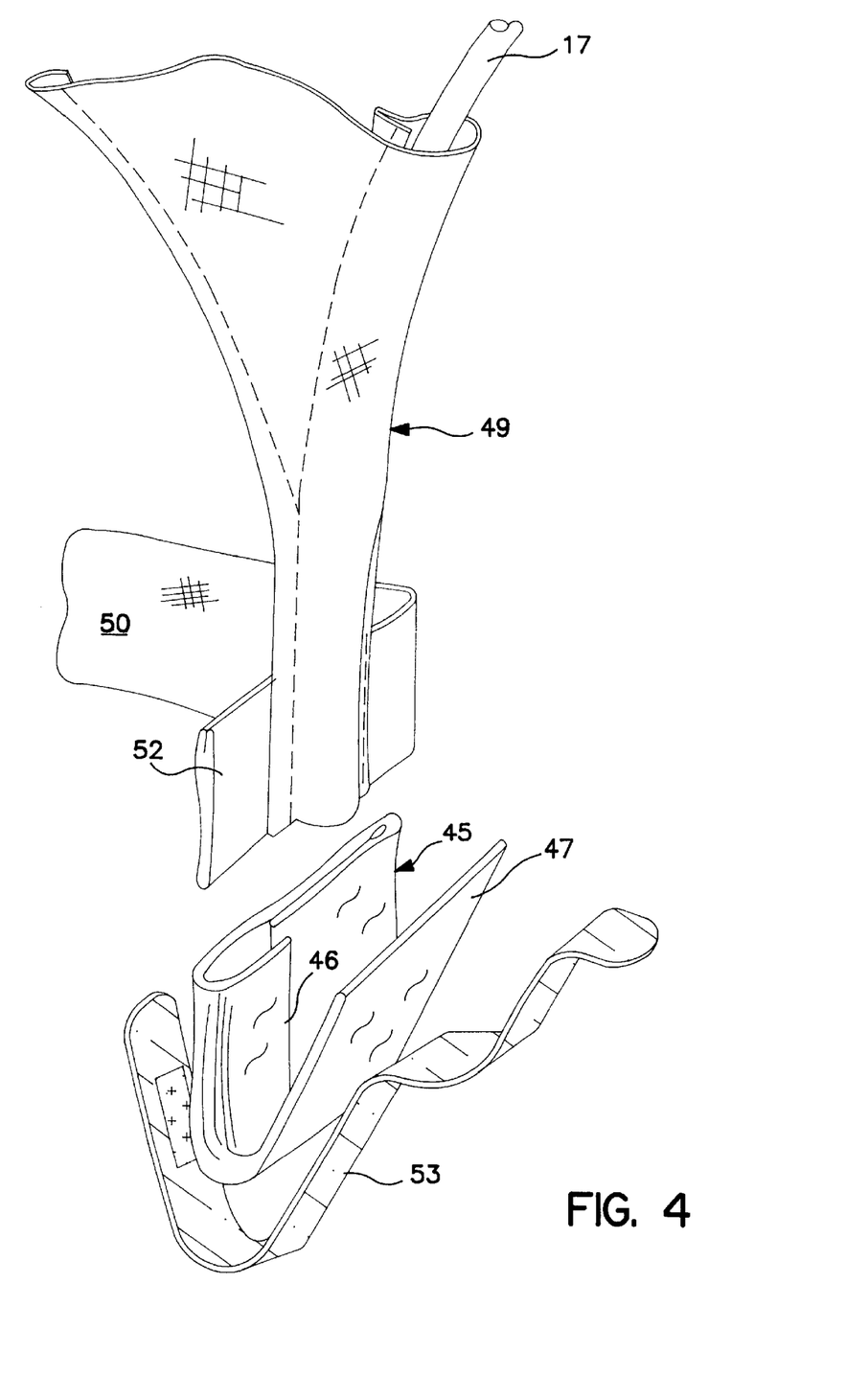
FIGS. 4, 4A are views showing an alternate mounting arrangement.
Figure 4A:
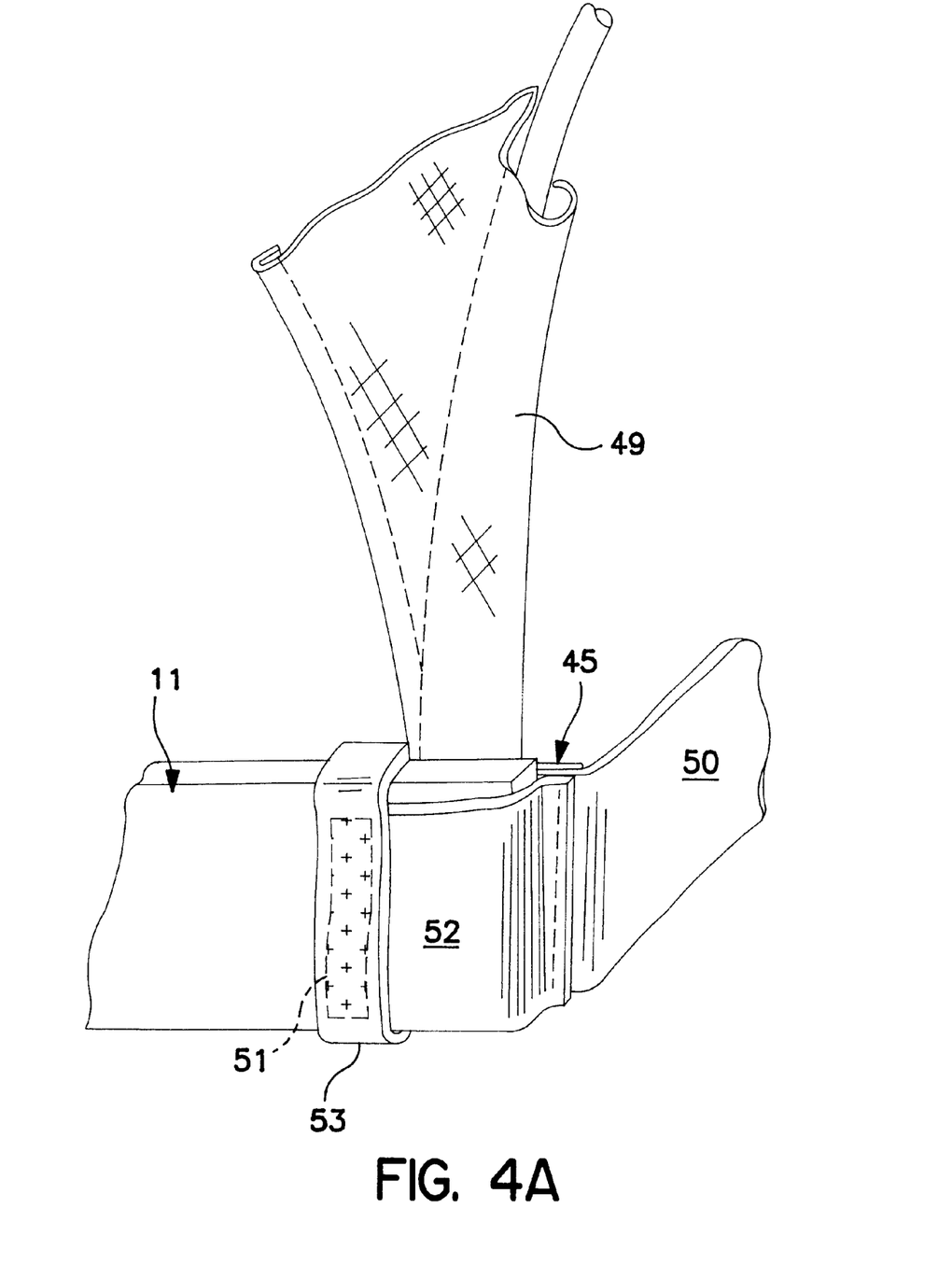

FIGS. 4 and 4A show a modification eliminating the bracket (20), and replacing it with a sewn pocket (45), which is formed with a bi-folded leaf (46) and overlay (47) that receives a corner leg (49) of the canopy top modified to capture the lower legs of the hoop members. A modified cross strap (50) is sewn to the lower leg and has a Velcro patch (51) on a return leg (52) which a Velcro strap (53) closes on gripping it against the side rails (11). The modification does not effect the way the hoop members and cover material cooperate to provide a one-piece unitary modular structure as described with reference to FIGS. 1–3, but is an alternative to the solid brackets (20) which as corner pieces of the wagon could be replaced with more pliable sewn materials for comfort and cost reasons.

Figure 5:
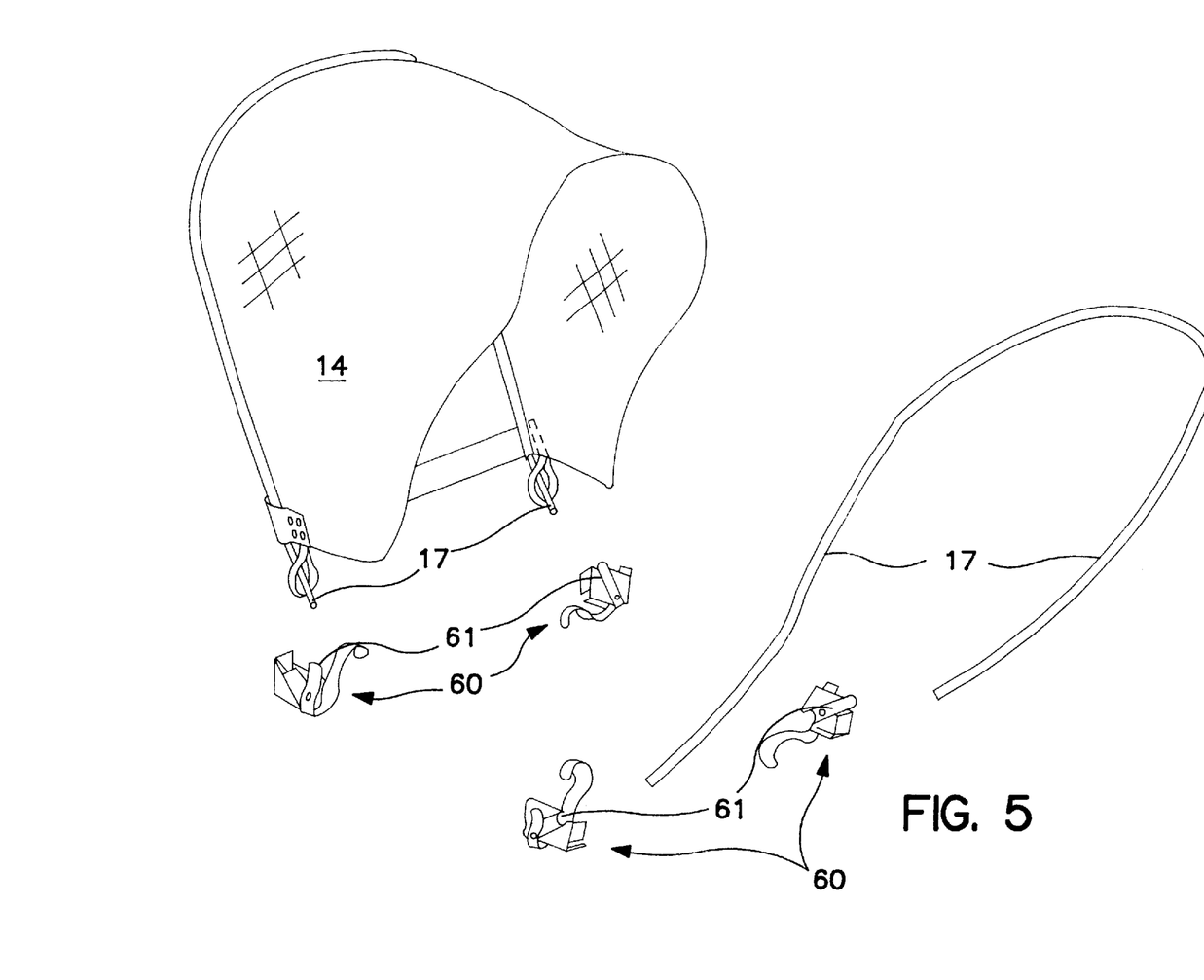
FIGS. 5, 5A and 6 are related views showing another alternate mounting arrangement.
Figure 5A:
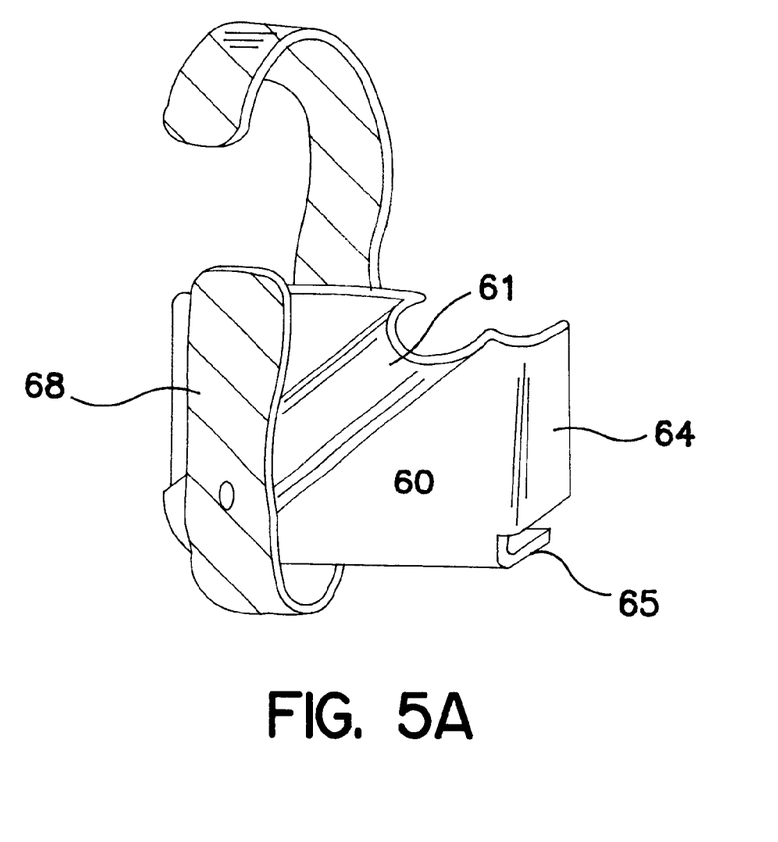
Figure 6:
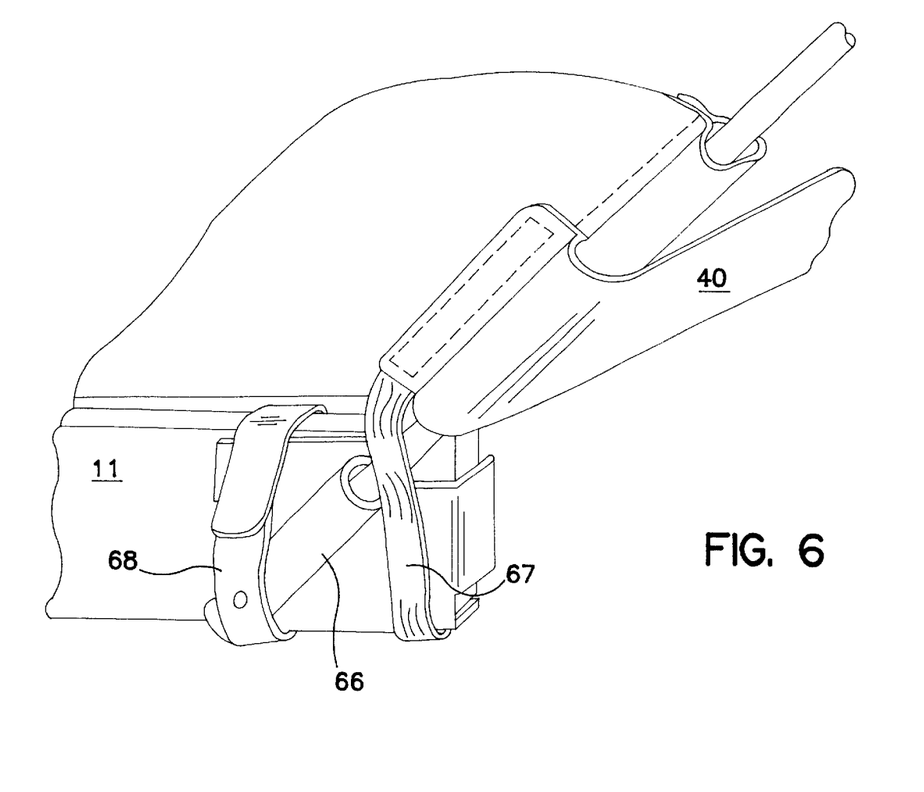

FIGS. 5, 5A and 6 show another modification that eliminates the need for a spreader rod (22) to stress the hoop members and flexible canopy to provide the synergistic effect. A bracket (60) has in inclined groove (61) in FIG. 5 that receives the lower legs of the hoop members (17) which disposes them at an angle greater than that allowed by the length of the flexible canopy (14) with the result that the mutual stressing of the frame and canopy occurs without a spreader rod (22) providing the force to stretch the material and distort the hoop members. The brackets (60) have end flanges (64) and lower flanges (65) fitting them to the side rails (11) as pictured in FIG. 6, which also shows a further modification in which the groove (61) is replaced with a tube (66). The cross strap (40) is sewn to the corner legs of the canopy as in FIG. 3B, except a secondary strap (67) cooperates with another Velcro strap (68) in holding the bracket firmly on the side rails.

Figure 7:
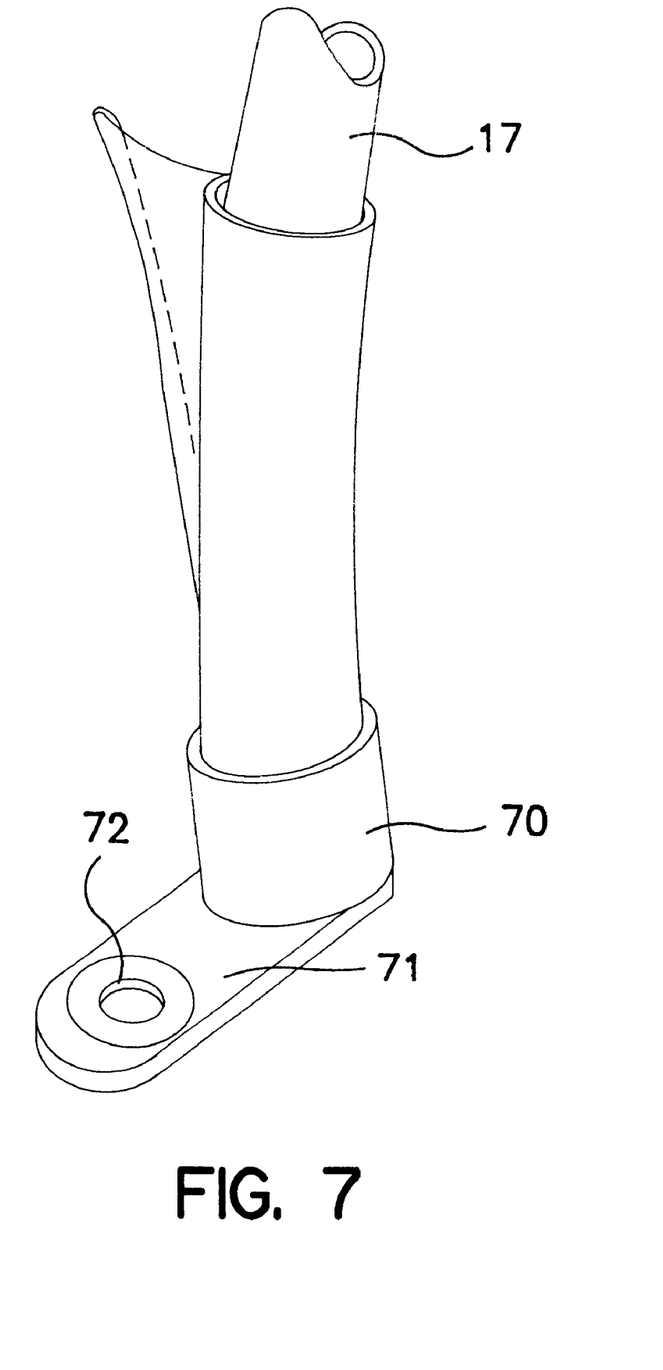
FIG. 7 is an enlarged, isolated view of one leg of the fabric top and hoop frame modified so when removed from the wagon, the four corners may be secured to the ground by a stake and become a shelter.

FIG. 7 is a further modification shown enlarged where a corner leg (35) of the canopy material is modified to provide a sewn foot (70) designed to capture the ends of the hoop members (17). The foot (70) has a flap (71) in which a grommet (72) is fixed providing a place for inserting a stake when the canopy is and used as a tent or shelter with the cross strap (not shown) holding the hoop member's legs from relaxing and with a spreader rod (not shown) providing the upper stretching forces for the synergistic modular effect, the stakes merely providing an anchor point but not adding strength to the framework of the tent. This modified corner leg and flap arrangement could be applied to the mounting in FIG. 4 or any similar bracket modification designed for mounting on any support member; modification with respect to the sewn pattern (FIG. 3), when combined with the hoop frame (FIG. 2), hoop members are captive in the channels (32) and the spreader rod (22) pushes the upper portions of the hoop members apart which results in the fabric being pulled taut which in turn builds internal stress in the hoop frame. The pattern and hoop frame combination provides a taut one-piece, modular shell. The length of the spreader rod (22) can be the same for different wagon lengths making the structure insensitive to the exact position of the mounting brackets (20). It is this modular, one-piece construction that allows the design to be used on a variety of wagon sizes. Wagons are available from several manufacturers and in many sizes. By means of the invention described, one pattern, set of frame elements and set of brackets can be used to fit on a large range of sizes and from different manufacturers. Although no standards have been made for this industry, manufactures tend to build wagons in size ranges. The invention is operable on and is designed to fit on all size ranges of wagons used to date including 32"×38", 38"×42", 42"×46", and 46"×50". These four groupings are typical of current wagon size ranges which the invention can accommodate by simply scaling up the dimensions. There is enough flexibility to adjust the lower legs of the hoop members to the spacing of the corner brackets within each range. A single pattern size (FIG. 3) and set of frame elements (FIG. 2) are used.

Indeed, it is a key feature of the invention that the lower legs of the hoop members are adjustable longitudinally within each wagon size range by stretching the fabric, with or without a spreader rod, as depicted in FIG. 5. This longitudinal tensioning of the fabric to accommodate the length of the wagon is a result, in pail, of the hoop members themselves being rigid enough to stretch the fabric material taut when the brackets (60) carrying the lower legs of each hoop member (17) are moved apart so the flanges (64), as shown in FIG. 5A, overlap the ends of the top rails of a stake sided wagon. The proportions are not increased until the size range exceeds the upper end of a given range. Then the long dimension at the center of the pattern is lengthened and, I used the spreader rod length is increased without affecting appreciably the overhang proportions as shown in FIG. 2 relative to the corner legs (35) mounted in the corner brackets. Thus a Conestoga taut appearance is achieved within each range of wagon sizes with a single frame and canopy set up; The width of the wagons does not affect fitting the invention to it. A wider wagon will result in slightly reduced headroom. With regard to FIG. 3B, the bracket (20), elastic straps (38) and cross strap (40) combine to provide a secure corner anchor design and safety features. The cross strap (40) is included to contain the hoop members in an arched shape when removed from the wagon. It also provides added protection from one hoop member accidentally breaking loose. The elastic straps (38) provide tension on the mounted fabric assembly which helps keep it taut. They also provide an anchor to the brackets at the protrusion (27) for the one-piece frame and canopy modular assembly securing the lower ends of the hoop members from unintentionally coming out of the tops of the sleeves (23).

In a preferred method of assembly, the folded canopy material retains the hoop members in the channels (32) with the lower ends held in a fixed apart relationship relative to the lateral spacing of the brackets installed in the corners of the side rails (11). Once inserted in the sleeves (23), and attaching the elastic straps (38) over the protrusion (27) to mount the hoop members, the only assembly step required is to connect the spreader rod to the Tee fittings, as pictured in FIG. 3A. In disassembly, the reverse procedure is employed leaving the brackets in place on the wagon if desired. The top is collapsed upon itself as a compact, hoop package, with the canopy material folded between the hoop members which then can be easily inserted into a bag for storage or transport.

These and other modifications will be apparent to those skilled in the art however such other structures are considered mere variations on the elements of the present invention and reasonable equivalents thereto are deemed to be within the scope of the present invention as defined in the appended claims.

We claim:

1. A collapsible canopy adapted to be deployed as a removable top on a child's wagon covering a range of commercially available bed sizes comprising:

a frame having convertible states, one an erected state and the other a collapsed state, said frame having a pair of hoop members in opposed relationship to each other, spaced apart in the erected state corresponding to a given bed size range on which the canopy is to be mounted , and spaced adjacently together when removed from the wagon in the collapsed state to form a compact, relatively flat frame for ease of storage or shipment, said hoop members each having lower leg portions joined by an arched central portion, the leg portions in the erected state being adjustable longitudinally within the range of bed sizes and adapted to be mounted adjacent opposed ends of any of several wagon beds within said range of sizes, a flexible covering material having bordering edges defining a relatively elongated continuous surface area, which in the erected state takes its shape from the opposed hoop members as a relatively high arched canopy over the entire wagon bed with the arched portions and lower leg portions of the hoop members capable of applying tension to the elongated surface area sufficient to make it taut without intermediate transverse supports in the erected state, and mounting means for removably attaching the leg portions of each hoop member adjacent opposed ends of a wagon bed in a given range of sizes being mutually spread apart by the act of attaching them to cause the tensioning of the surface area in the erected state.

2. A collapsible canopy as set forth in claim 1 wherein said frame includes a longitudinal element separating the hoop members from each other near the top of the arched central portion when said hoop members are in the erected state a distance sufficient to mutually stress the hoop members and the flexible material a predetermined amount.

3. A collapsible canopy as set forth in claim 2 wherein the flexible material is a woven fabric, the hoop members and longitudinal element are lengths of flexible rod, capable of being elastically bowed in the erected state.

4. A collapsible canopy as set forth in claim 2 wherein the longitudinal element is a flexible rod longer than the bordering edges of the flexible material spanning the distance between the hoop members causing it to bow tangentially to the surface area and mutually stress the hoop members and flexible material in the erected state.

5. A collapsible canopy as set forth in claim 1 wherein the frame comprises a pair of hoop members spaced from each other having lower pairs of legs space a fixed lateral distance apart in the erected state corresponding to the width of the wagon bed, and in peripheral engagement with the bordering edges of the flexible material, each pair of legs being attached by said mounting means adjacent opposed ends of the wagon bed and being adjustable fore and aft a mutual distance relative to said ends to cause the hoop members to stress the covering material into a taut state over the wagon bed.

6. A collapsible canopy as set forth in claim 1 wherein the frame comprises a pair of hoop members, space longitudinally apart and in peripheral engagement with the bordering edges of the flexible material defining a relatively high, open arch at the spaced apart locations, each hoop member having a pair of lower legs fixed a predetermined lateral distance apart and spaced longitudinally from the other pair of legs a lesser distance than the longitudinal space between the arches, said frame comprising a linear flexible element removably extending between the hoop members yieldably maintaining the longitudinal space between said arches in the erected state.

7. A collapsible canopy as set forth in claim 6 wherein the hoop members are comprised of a pair of linear flexible elements, each bowed inwardly to define said arches, a Tee fitting joining said elements at said arches having a horizontal leg portion extending toward each other, said linear flexible element being removably joined to the hoop members at said horizontal leg portion.

8. A collapsible canopy a set forth in claim 7 adapted to be mounted on a child's wagon comprising in addition:

dual pairs of brackets, one pair at opposite ends of the wagon being removably mounted thereto, said bracket pairs having means for removably receiving the lower legs pairs of the hoop members.

9. A collapsible canopy as set forth in claim 8 wherein the pairs of brackets each comprises a metal base portion, and a flange portion, an upright sleeve supported on the base portion adapted to receive one lower leg of each hoop member, and said flange portion being removably engageable with the wagon.

10. A collapsible canopy as set forth in claim 8 wherein the pairs of brackets each comprises a non-metallic fabricated pocket adapted to receive the lower legs of the hoop members.

11. A collapsible canopy in combination with a child's wagon comprising: a pair of hoop members, each defining an arched center and having a pair of lower legs spaced a predetermined distance apart, a covering material adapted to be supported by the hoop members having quadrilateral leg portions adapted to cooperate with the lower legs of each hoop member in causing the covering material to take the shape of the hoop members, and when assembled with the hoop members on a wagon, the arched center of the hoop members elevating the covering material above the wagon sufficiently to provide an arched canopy over children as occupants riding in the wagon, dual pairs of mounting means , one pair for each hoop member, capable of removably attaching each pair of lower legs of a hoop member a predetermined longitudinal distance from the lower legs of the other hoop member, said predetermined longitudinal distance corresponding to a range of wagon sizes which are adapted to be covered by a single canopy, and means for spreading apart the hoop members at the arched centers a mutual distance fore and aft beyond the mounting locations for the lower legs and cooperating with the hoop members for tensioning the covering material uniformly.

12. A collapsible canopy in combination with a child's wagon as set forth in claim 11 where the wagon has stake side rails and said mounting means comprising:

strap means on each quadrilateral leg portion of the covering material adapted to cooperate with the side rails of the wagon for removably attaching the lower legs of each hoop member at said predetermined longitudinal distance apart.

13. A collapsible canopy in combination with a child's wagon as set forth in claim 12 wherein the hoop members are each comprised of a pair of rods, each having a length to diameter ratio and modulus of elasticity allowing it to bend repeatedly toward the other rod to form said arched center when joined, a Tee fitting having a cross connection and a leg connection, the rods being removably joined by the cross connection to form said arched center of the hoop members, each leg connection of the Tee fittings opening toward the other hoop member, and said means for spreading apart the hoop members comprising a spreader rod longer than the longitudinal distance between the mounting location for the lower legs of the hoop members removably connected to the leg connections of the Tee fittings.

14. A collapsible canopy in combination with a child's wagon as set forth in claim 13 wherein the wagon has wooden stake side and end rails for providing a corner mounting location for said dual pairs of mounting means each of which comprises:

a bracket having a base portion having side flanges projecting at about 90 degrees to the base portion adapting it to be secured in a corner of the wagon formed by the side and end rails, an upright sleeve secured to the base portion and adapted to removably receive a lower leg of a hoop member, and said strap means comprising a pair of attaching straps, one associated with each flange, removably attaching the brackets in each corner of the side rails.

15. A method of making a collapsible canopy adapted to be mounted on side rails of a conventional stake wagon accommodating a range of wagon sizes comprising the steps of:

providing a flexible material having a surface area bordered by curved channel edge portions at opposed ends of the material joining quadrilateral leg portions at the corners, the curved channel edge portions adapted to curve outwardly in overlapping relationship to a wagon dimension at the upper end of the range of sizes, and defining a continuous passageway into said leg portions, except for a gap in each of the curved channel edge portions near the center of the area of greatest overlap, and inserting a pair of hoop members, one into each passageway, each hoop member having a pair of lower leg portions extending into the quadrilateral leg portions of said flexible material and an arched center portion extending into said curved channel edge portion and being accessible through said gap, providing means on each quadrilateral leg portion adapted to cooperate with the side rails of a wagon for attaching the canopy when deployed in its erected state, and engaging a rod means between the hoop members at said gap for mutually displacing each channel edge portion into an overlapping relationship with a wagon when the canopy is to be deployed in the erected state.

16. A method of making a collapsible canopy as set in claim 15 where the means for attaching the canopy is a length of flexible material affixed to each quadrilateral leg portion and adapted to be secured around a rail on the opposite sides of the wagon.

17. A method of making a collapsible canopy as set forth in claim 15 comprising in addition the step of-applying a graphic to the flexible material for display of a visual element adapted to viewed from a distance when the canopy is erected.

18. A collapsible canopy when erected having a modular strength adapting it to be used as a shelter over a supporting structure comprising:

a hoop frame composed of a pair of hoop members, each having upper hoop contours arched over a pair of lower legs spaced laterally apart, a flexible material providing a surface area supported by the hoop frame having opposed pairs of peripheral edges and descending pairs of quadrilateral leg portions coextensive with said hoop member pairs of legs, one pair of opposed peripheral edges defining outwardly curved portions and the other pair upwardly curved portions in relationship to the leg portions, the one pair being coextensive with said upper hoop arched contours, and means acting on the hoop members when the canopy is erected for causing the upper hoop arched contours to spread apart to the limit permitted by the one pair of outwardly curved peripheral edge portions and the lower pairs of legs to likewise be spread apart to the limit of the other pair of upwardly curved peripheral edge portions of the flexible material whereby when erected the canopy becomes a relatively taut shelter over the supporting structure.

19. A collapsible canopy as set forth in claim 18 wherein the supporting structure is a child's pull wagon having a rectangular bed with laterally spaced side walls establishing a predetermined lateral distance said hoop member leg portions are spaced apart and front and rear end walls of a plurality of wagon sizes establishing various lengths between the end walls,     the hoop frame adapted to be mount on each of the various lengths between end walls of a plurality of wagons within a given range of wagon sizes without having to change the relationships of the outwardly and upwardly curved peripheral edge portions of the flexible material to cover the plurality of wagon sizes.

20. A collapsible canopy according to claim 19 wherein the hoop frame includes in addition a flexible spreader rod attachable between the hoop members.

* * * * *